Oct. 8, 1957  W. I. McLAUGHLIN  2,808,811
VALVE FOR REVERSIBLE FLOW PRESSURE FLUID SYSTEM
Filed Sept. 21, 1954  3 Sheets-Sheet 1
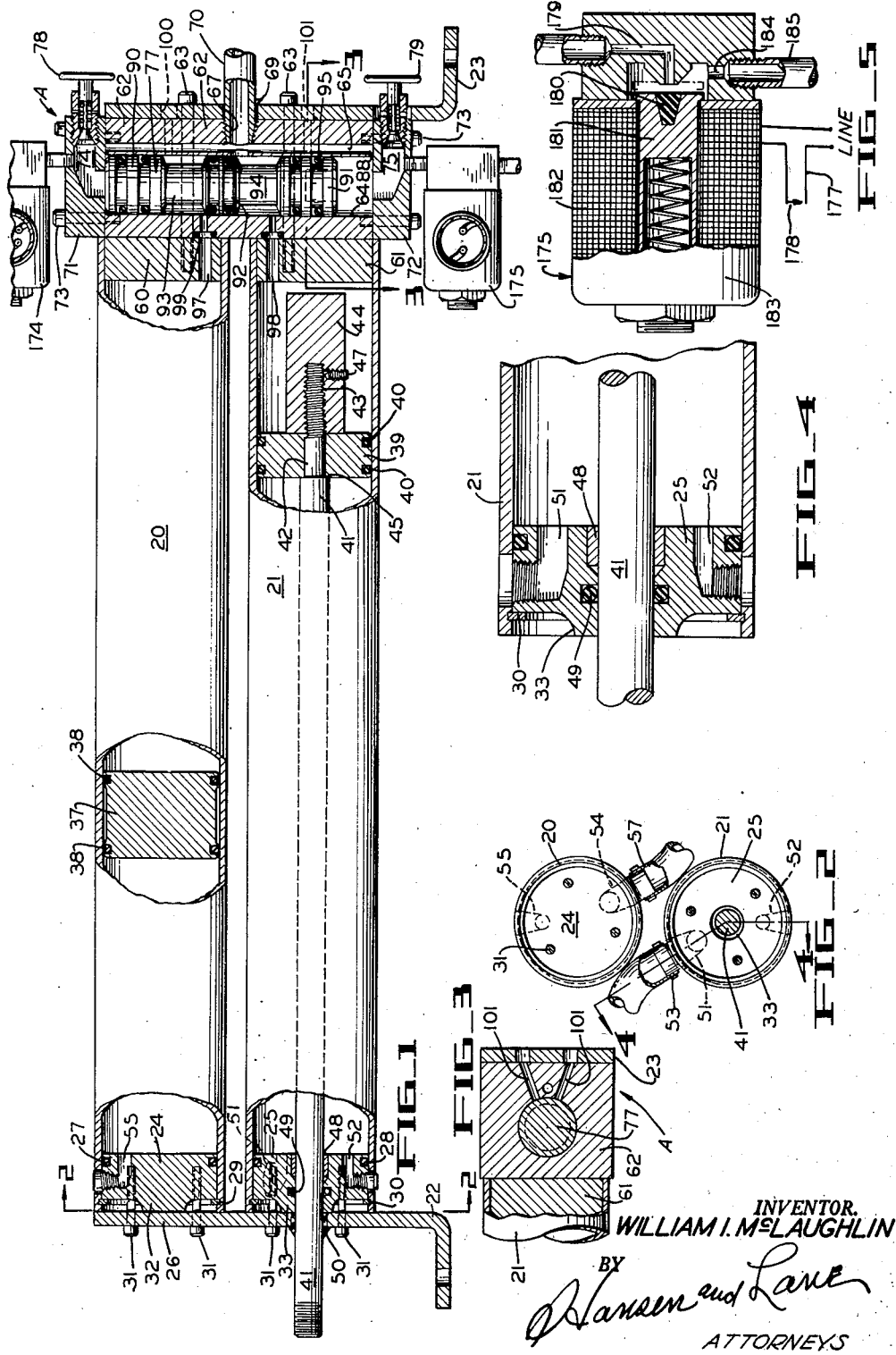
INVENTOR.
WILLIAM I. McLAUGHLIN
BY
Hansen and Lane
ATTORNEYS Oct. 8, 1957  W. I. McLAUGHLIN  2,808,811
VALVE FOR REVERSIBLE FLOW PRESSURE FLUID SYSTEM
Filed Sept. 21, 1954  3 Sheets-Sheet 2
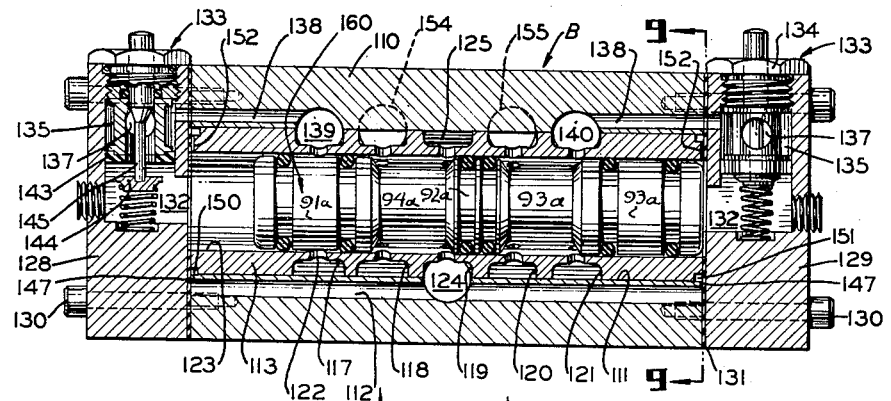
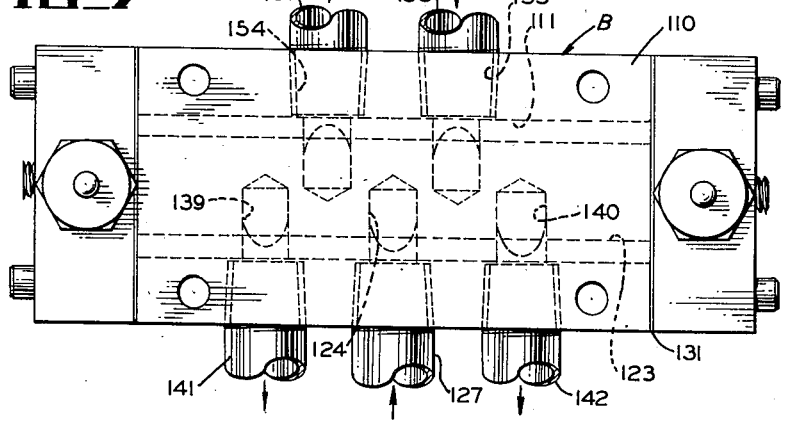
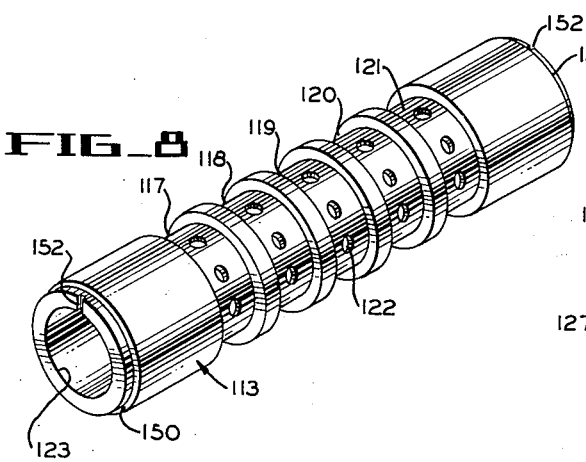
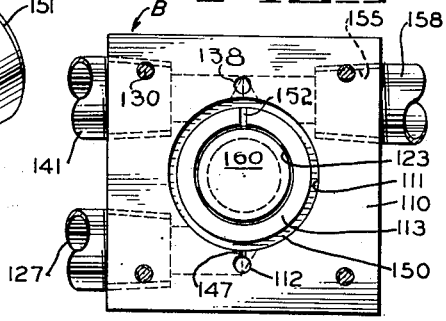
INVENTOR.
WILLIAM I. McLAUGHLIN
BY
*Hansen and Lane*
ATTORNEYS Oct. 8, 1957  W. I. McLAUGHLIN  2,808,811
VALVE FOR REVERSIBLE FLOW PRESSURE FLUID SYSTEM
Filed Sept. 21, 1954  3 Sheets-Sheet 3
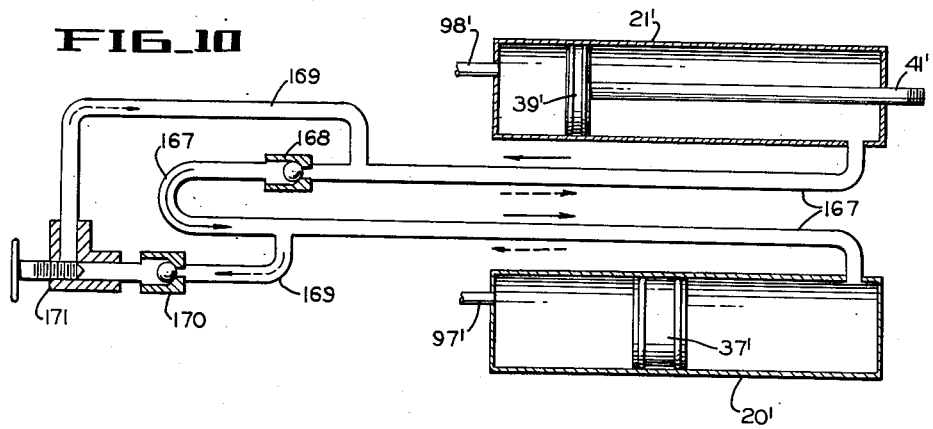
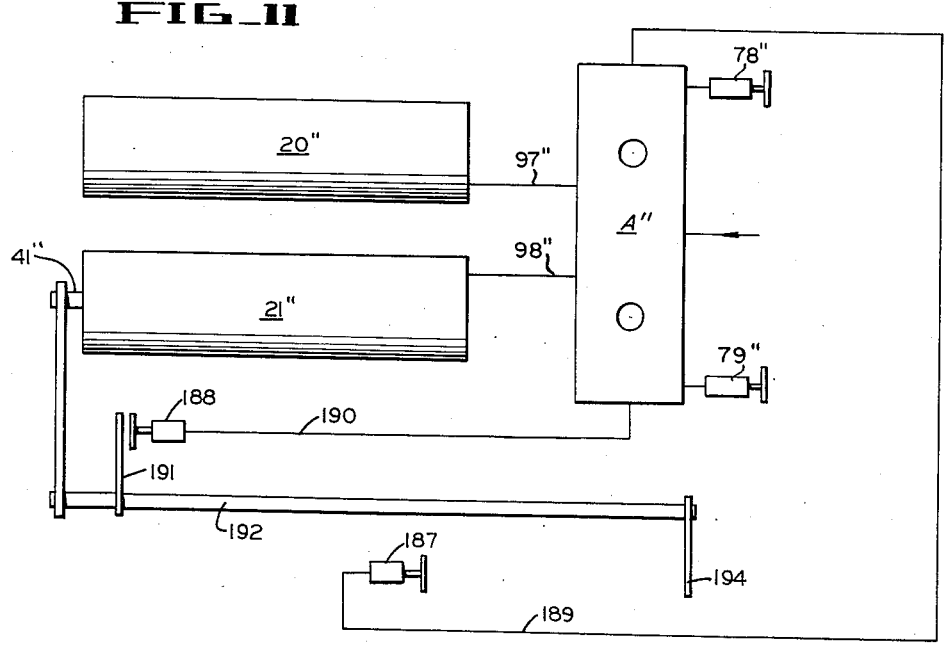
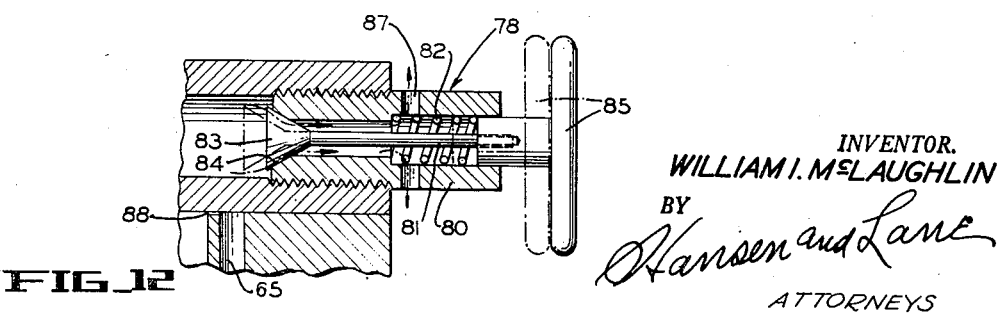
INVENTOR.
WILLIAM I. McLAUGHLIN
BY Hansen and Lane
ATTORNEYS

United States Patent Office 2,808,811
Patented Oct. 8, 1957

2,808,811

VALVE FOR REVERSIBLE FLOW PRESSURE FLUID SYSTEM

William I. McLaughlin, Oakland, Calif.

Application September 21, 1954, Serial No. 457,467

6 Claims. (Cl. 121—46.5)

The present invention relates to hydraulic control apparatus, and pertains more particularly to apparatus for actuating machine tools and other devices, and to a control valve therefor.

In various phases of industry, for example in the machine tool industry, it frequently is desirable to operate various machine elements at acurately controlled rates of speed, and at times under substantial and sometimes varying loads. It frequently is desirable to provide for a rapid return stroke of a tool or machine element upon completion of a slow, power stroke thereof.

The present invention contemplates the provision of a simple and positively hydraulically controlled machine feed apparatus. The invention also provides for an improved control cylinder structure and arrangement.

The invention also provides an improved valve mechanism for accurately and positively controlling a flow of pressurized fluid.

The invention also has for its object to provide an improved arrangement for accurately and positively controlling the admission and release of actuating fluid to a pair of cylinders in each of which a piston is mounted, the opposite ends of the pistons from those to which the actuating fluid is applied being embodied in a hydraulic control circuit.

A still further object of the invention is to provide a controlled hydraulic system with an improved cylinder head structure.

These and other objects and advantages of the invention will be brought out more fully in the following description and in the accompanying drawings, wherein Fig. 1 is a side elevational view of a pair of air-hydraulic cylinders and valve control mechanisms mounted thereon, portions being broken away, and other portions being shown in section.

Fig. 2 is a transverse sectional view taken along line 2—2 of Fig. 1.

Fig. 3 is a fragmentary sectional view taken along line 3—3 of Fig. 1.

Fig. 4 is an enlarged sectional view taken along angularly offset line 4—4 of Fig. 2.

Fig. 5 is an enlarged view partly in side elevation and partly in section of a solenoid release valve shown in Fig. 1.

Fig. 6 is a longitudinal median sectional view through a modified form of valve from that shown in Figs. 1 and 2.

Fig. 7 is a plan view of the valve shown in Fig. 6.

Fig. 8 is an isometric projection of a valve sleeve embodied in the valve shown in Figs. 6, 7 and 9.

Fig. 9 is a sectional view taken along line 9—9 of Fig. 6.

Fig. 10 is a schematic diagram in the nature of a sectional view showing a pair of air-hydraulic cylinders and a hydraulic control system associated therewith.

Fig. 11 is a diagrammatic view of a remote control system embodying the apparatus shown in Fig. 1.

Fig. 12 is an enlarged sectional view of a manually operated air release valve of the type employed in Fig. 1.

Referring first to the structure illustrated in Figs. 1 to 5 inclusive, and in Fig. 12, a pair of air-hydraulic cylinders 20 and 21 of equal length are mounted in axially parallel relation between a pair of mounting brackets 22 and 23. A compressed air control valve mechanism A is interposed between the right hand end of the cylinders 20 and 21 as illustrated in Fig. 1, and the right hand mounting bracket 23. The left hand ends of both cylinders 20 and 21 as shown in Fig. 1 are provided with cylinder head disks 24 and 25 respectively, which are fitted into the bores of their respective cylinders and are sealed to the cylinder walls by hydraulic sealing rings 27 and 28 respectively. A pair of snap retaining rings 29 and 30 are mounted one over each cylinder head 24 and 25 respectively, and are fitted into annular grooves provided therefor in the walls of their respective cylinders.

Screws 31 are inserted through holes provided therefor in the left hand mounting bracket 22 and are screwed into threaded holes provided therefor in the cylinder heads 24 and 25. Bosses 32 and 33 are provided on the outer ends of the cylinder heads 24 and 25 respectively to bear against the mounting bracket 22 when the screws 31 are tightened to draw the cylinder heads into contact with the snap rings to avoid overstressing the parts. The tension on the screws 31 draws the cylinder heads 20 and 21 snugly against their respective snap rings, and in turn draws the cylinders 20 and 21 snugly against the bracket 22.

A floating piston 37 is fitted for axial slidable movement in the upper cylinder 20 and is sealed to the wall thereof by hydraulic sealing rings 38 mounted in grooves provided therefor around the piston. A second piston 39, having hydraulic sealing rings 40 mounted in annular grooves therein is similarly mounted in the lower cylinder 21. A piston rod 41 is secured to the lower piston 39 by inserting a reduced end portion 42 of the piston rod through a hole provided therefor axially of the piston. A threaded end portion 43 of this reduced piston rod portion 42 is screwed into a spacing block 44 to draw the offset shoulder 45 of the piston rod into tight sealing relation with one side of the piston 39 and to draw the spacing block 44 tightly against the other side of the piston 39. The spacing block 44 is secured against loosening on the threaded rod portion 43 by a conventional set screw 47. The piston rod 41 fits slidably in a hole provided therefor axially of the lower cylinder head 25 and is sealed thereto by a conventional packing sleeve 48 and a hydraulic sealing ring 49.

A dust seal 50, which may be of synthetic rubber, is mounted in a hole provided therefor in the left hand mounting bracket 22 to have a close sliding fit around the piston rod 41.

A hole 51 (Figs. 1, 2 and 4) for the passage of hydraulic liquid opens into the lower cylinder 21 through the head 25, and a second similar hole 52 also is provided for bleeding air from the cylinder when necessary. These holes are taper threaded to receive conventional tube fittings such as the fitting 53.

The upper cylinder head 24 is provided with a pair of similar holes 54 and 55 (Fig. 2), a pipe fitting 57 being screwed into the hole 54.

A pair of cylinder head disks 60 and 61 are fitted into the right hand ends of the cylinders 20 and 21, respectively, as shown in Fig. 1, and are permanently secured in sealing relation therein as by means of silver soldering, not shown.

The valve A interposed between the right hand ends of the cylinders 20 and 21 (Figs. 1 and 2) and the right hand mounting bracket 23 comprises a valve block 62 which may be of rectangular cross sectional shape as shown in Figs. 1 and 3. Screws 63 are inserted through holes provided therefor in the bracket 23 and the valve block 62, and are screwed into threaded holes provided therefor in the cylinder heads 60 and 61 to secure these parts in tightly assembled relation.

A cylindrical valve chamber 64 and a small diameter air passage 65 extend in axially parallel relation longitudinally through the entire length of the valve block 62. A threaded inlet opening 67 for admitting compressed air is provided midway of the length of the valve block 62 to open into both the air passage 65 and the valve chamber 64. A hole 69 is provided in the bracket 23 to register with the threaded air inlet opening 67 in the valve block to permit threaded insertion of a conventional pipe fitting 70 therein.

Valve heads 71 and 72 are mounted one on each end of the valve block 62 and are secured thereto by screws 73. A thin sheet gasket (not shown) of relatively hard material such as conventional hard fibre sheet gasket material may be interposed between the ends of the block 62 and the valve heads 71 and 72 to seal the contacting surfaces of these parts.

Air compartments 74 and 75 for actuating a valve plunger 77 are provided one in each of the heads 71 and 72 respectively. Identical spring-closed air release valves 78 and 79 are mounted one in each of the valve heads selectively to control the release of air from the end compartments 74 and 75. Each of these air release valves 78 and 79 comprises (Fig. 12) a threaded bushing 80 screwed into a threaded opening provided therefor in each valve head to open into the end compartment therein. A valve stem 81 is biased axially outwardly by a coil spring 82 to urge a cone-shaped valve head 83 on the inner end of the stem against a seat 84 formed around the inner end of the bushing 80. Either release valve 78 or 79 may be opened by pressing a push button head 85 mounted on the outer end of the valve stem 81 inwardly to its broken line position of Fig. 12. Relief ports 87 are provided in the bushing 80 beyond the valve head to permit air admitted into the bushing by the opening of the valves 78 or 79 to escape to the atmosphere.

For continuously bleeding small amounts of compressed air into both valve head compartments 74 and 75 from the air passage 65, a small notch 88 (Figs. 1 and 12) is provided in each end of the valve block 62 to extend from the air passage 65 to the valve chamber 64 therein. Since the air passage 65 is open to the compressed air inlet opening 67, pressurized air is constantly fed through the air passage 65 and the bleed notches 88 into both end compartments 74 and 75.

The valve plunger 77 (Figs. 1 and 3) comprises a pair of similar end portions 90 and 91 and a central portion 92, all three of which plunger portions have a sliding fit within the valve chamber 64. The intermediate plunger portions 93 and 94 which are located between the central plunger portion 92 and each of the end portions 90 and 91 respectively, are of reduced diameter. Each of the plunger end portions 90 and 91 and the central portion 92 has a pair of conventional hydraulic sealing rings 95 mounted in annular grooves provided therefor in these plunger portions. The reduced plunger portions 93 and 94 are spaced from the wall of the chamber 64 to provide passages to alternately communicate the interior of first one and then the other of the cylinders 20 and 21 with the central compressed air inlet 67, while at the same time opening to exhaust the cylinder not communicating with the inlet 67.

Ports 97 and 98 open from the interior of the valve chamber 64 through the block 62 and the cylinder heads 60 and 61 respectively into the ends of the cylinders 20 and 21. Hydraulic sealing rings 99 (Fig. 1) mounted in recesses provided therefor, seal the ports 97 and 98 against leakage at the plane of juncture of the valve block 62 and the cylinder heads 60 and 61. These ports 97 and 98 are spaced at equal distances from the central compressed air inlet (Fig. 1) and are so located that when the valve plunger 77 is at one endwise limit of movement one of the ports 97 or 98 will be open to the compressed air inlet 67 through the space provided by a reduced intermediate portion of the valve plunger, while the other of said ports will be sealed off from the air inlet by the enlarged central portion 92 of the plunger.

Vent ports 100 and 101 (Figs. 1 and 2) are provided to open outwardly from the valve chamber 64 at points axially slightly beyond the ports 67 and 68 to the cylinders. These vent ports are so located as to lie between the sealing rings 95 on one enlarged plunger end portion 91 or 92 when the plunger 77 is in one endwise limit of movement and to be in communication with a port 97 or 98 to a cylinder when the plunger is in its other endwise limit of movement.

For example, when the valve plunger 77 is in the position shown in Fig. 1, the vent port 100 in the valve block 62 opens into the space provided by the upper reduced plunger portion 93 as does also the port 97 to the upper cylinder 20, thereby communicating the interior of the upper cylinder 20 to the atmosphere. In this same position of the valve plunger, the compressed air inlet 67 is sealed off from the upper cylinder port 97 by the sealing rings of the enlarged central portion 92 of the valve plunger.

In this same position of the plunger, the compressed air inlet 67 opens into the space provided by the lower reduced portion 94 of the plunger and thence through the port 98 into the lower cylinder 21, while the lower vent port 101 is sealed off from the remainder of the valve chamber by the sealing rings on the enlarged lower end portion 91 of the plunger.

Assuming that the pressure in the end compartments 74 and 75 has been equalized by a flow of compressed air through the passage 65 and the bleed notches 88, upon pressing the push button 85 to open the lower release valve 79 the pressure in the lower end compartment 75 will drop to atmospheric, whereupon the relatively higher pressure in the upper end compartment 74 will drive the valve plunger downward to the opposite, and relatively reversed, limit of movement to vent the lower cylinder 21 to the atmosphere and to communicate the upper cylinder 20 to the compressed air inlet 67. Since this lowered position of the plunger 77 would be simply the reverse of that shown in Fig. 1 it will be obvious to one familiar with prior valve structures and their operation without further illustration.

In the modified form of valve B illustrated in Figs. 6 to 9, inclusive, a valve body block 110 has a cylindrical bore 111 and a compressed air passage 112 parallel thereto extending throughout its entire length. A tubular valve sleeve 113 is shrink-fitted into the bore 111 in the valve block. This is done by making the sleeve 113 a few thousandths of an inch greater in external diameter than the internal diameter of the bore, and either heating the block 110 or chilling the sleeve 113 sufficiently to permit insertion of the sleeve to the position shown in Fig. 6, flush with the ends of the block. When the temperatures of the sleeve and block equalize, the sleeve will be gripped securely, and in airtight relation throughout its areas of contact with the wall of the bore 111.

The sleeve is provided with five external grooves 117, 118, 119, 120 and 121 as shown in Figs. 6 and 8, and through the bottom of each of these grooves a plurality of ports 122 open through the sleeve into its central bore 123 which comprises the valve chamber of this form of the invention.

A compressed air inlet 124 in the valve block 110 opens into the air passage 112 and the annular space 125 defined by the central annular groove 119 in the sleeve and the wall of the bore 111. This air inlet passage 124 is threaded to receive a conventional pipe fitting 127 (Figs. 7 and 9).

Valve heads 128 and 129 are mounted by screws 130, one on each end of the valve block 110 and are sealed thereto and to the ends of the valve sleeve 113 by gaskets 131. Each valve head has a plunger actuating air compartment 132 therein, and a threaded air release valve 133 is screwed into a threaded opening provided therefor in each valve head. The valve 133 comprises a threaded bushing 134 having an annular groove 135 around the bushing, with an opening 137 which communicates the interior of the bushings with the groove 135 which in turn communicates with a passage 138 drilled in the valve block 110 and opening into vent outlets 139 and 140 respectively, into which are screwed vent pipes 141 and 142.

An annular valve seat member 143 which may be of synthetic rubber is mounted on the inner end of each release valve bushing 134 and is normally closed by a spring pressed valve head 144 having a valve stem 145 slidably mounted in the bushing 134 to project outwardly therefrom. Pressing inwardly on the projecting end of the valve stem 145 opens the release valve 144 and allows fluid in the end compartment 132 with which it communicates to vent through the passage 138 and the vent pipe 141 or 142 associated therewith.

Both ends of the block 110 have notches 147 therein which extend from the bore 111 to the air passage 112 to provide bleed openings from said passage into annular recesses 150 and 151 (Figs. 6, 8 and 9) provided one around each end of the valve sleeve 113. A notch 152 also is provided in each end of the sleeve 113 to admit pressurized fluid from the annular recess 150 or 151 into the end compartment 132 associated therewith.

A pair of passages 154 and 155, corresponding to the ports 97 and 98 to the cylinders in valve A (Figs. 1 and 3) open into the annular spaces defined by the wall of the bore 111 and the annular sleeve grooves 118 and 120 located on axially opposite sides of the central annular sleeve groove 119. The outer ends of these passages 154 and 155 are taper threaded to receive conventional pipe fittings 157 and 158, respectively (Figs. 7 and 9) which may, in turn, be connected one to each of a pair of cylinders (not shown) or other load application.

The vent outlets 139 and 140 (Figs. 5, 6, 7 and 9) mentioned previously herein, communicate with the annular spaces defined by the wall of the bore 111 and the outermost grooves 117 and 121, respectively, in the sleeve 113.

A valve plunger 160 (Figs. 6 and 9) is generally similar to the plunger 77 illustrated and described for the form of the invention shown in Figs. 1 and 3, and operates in a generally similar manner. The portions of the plunger 160 (Figs. 6 and 9) corresponding to those of the plunger 77 of valve A are identified by the same reference numerals with the suffix (a) added. In view of the similarity between the two plungers and their manner of operation, it will be unnecessary to describe the plunger 160 in detail.

In operating the form of the invention shown in Figs. 1 to 4 inclusive, compressed air is supplied to the air inlet opening 67 and thence through the passage 65 and the bleed notches 88 to the air compartments 74 and 75 in the valve heads. In the one actuated condition of the valve A shown in Fig. 1, wherein the plunger 77 is in its upper limit of movement, compressed air flows from the air inlet 67, around the air passage provided by the lower reduced portion 94 of the plunger and through the port 98 into the lower cylinder 21, exerting an outward or left hand pressure on the piston 39 therein and urging the piston rod 41 outwardly to the left.

In this same position of the plunger 77, the right hand end of the upper cylinder 20 is free to vent the air to the right of the piston 37 therein through the upper port 97, around the air passage provided by the upper reduced portion 93 of the valve plunger 77 and thence out the upper vent ports 100.

With the plunger 77 in the position thereof shown in Fig. 1, and the air pressure in the valve head compartments 74 and 75 equalized to substantially the pressure of the compressed air at the inlet 67 by the flow of compressed air through the bleed notches 88, upon depressing the push button 85 of the lower air release valve 79, said valve is thereby opened to release to the atmosphere the compressed air in the lower end compartment 75, thereby reducing the pressure therein substantially to atmospheric pressure. Thereupon, the relatively greater pressure of the compressed air in the upper end compartment 74, acting upon the upper end of the valve plunger 77 drives the latter downwardly to the opposite end of the valve chamber 64 from its position shown in Fig. 1. In this relatively reversed position of the plunger, the compressed air inlet 67 will open into the annular air passage provided by the upper reduced portion 93 of the plunger 77 and thence through the upper port 97 into the upper cylinder 20, while the port 98 from the lower cylinder 21 will communicate through the annular passage provided by the lower reduced portion 94 of the plunger 77 with the vent ports 101 to the atmosphere.

In Fig. 10 is shown schematically an arrangement whereby the apparatus of Fig. 1 may be actuated to move the work performing piston rod 41 at a slow, controlled-speed rate in one direction, and at a rapid, load-free rate in a return or opposite direction. The parts of Fig. 10 which correspond to those of Fig. 1 are designated by identical reference numerals with the prime (') added.

Cylinders 20' and 21', the positions of which are inverted from those of the pistons 20 and 21 of Fig. 1, have ports 97' and 98' opening respectively thereto through which compressed air may be selectively admitted or vented to the atmosphere by valve means (not shown) which may be similar to the valve A illustrated in Figs. 1 and 3 and described previously herein.

The work piston 39' and floating piston 37' divide the cylinders 21' and 20' so that the air on the left hand side of these pistons as shown in Fig. 10 will be separated from the hydraulic liquid (not shown) on the right hand side thereof. From the liquid-containing end of the cylinder 21', a loop 167 of tubing is connected through a conventional ball-check valve 168 to the liquid-containing end of the other cylinder 20'. A by-pass loop 169 of tubing has its ends connected to open into the loop 167 on opposite sides of the ball-check valve 168 therein. A second ball-check valve 170 and a conventional needle valve 171 are provided in the by-pass loop 169.

The first ball check valve 168 is mounted to open to pass liquid flowing in the direction of the solid line arrows from cylinder 21' into cylinder 20', and to close upon an attempted reverse flow of the liquid in the direction of the broken line arrows.

The other ball-check valve 170 is mounted to open to pass liquid flowing from the cylinder 20' to the cylinder 21' in the direction of the broken line arrows in Fig. 1 and to prevent flow in the opposite direction. During a flow of liquid in the direction of the broken line arrows, the liquid is forced to flow, by the closing of the first ball-check valve 168, through the by-pass loop 169 and the needle valve 171 therein. The flow rate of the liquid in this latter direction thus may be controlled by means of the needle valve.

For operating either the valve A (Figs. 1 and 3) or the valve B (Figs. 6 to 9) by remote control, solenoid relief valves 174 and 175 (Figs. 1 and 5) may be operated from remote points by means of conventional electrical circuits 177 shown diagrammatically in Fig. 5, including control switches 178.

In the solenoid valve 175 (Figs. 1 and 5) a passage 179 communicating with the end compartment 75 of the valve A, and is closed by a rubber valve insert 180 in the end of a spring-pressed plunger 181. The plunger 181 constitutes the axially movable core of a usual solenoid coil 182, which, in turn, is encased in a sheet metal shell 183.

Upon energizing the coil 182 by closing the switch 178, the core plunger 181 is witdrawn from its normal, broken-line closed condition, to its solid line open position of Fig. 5, thereby opening the relief passage 179 and communicating it with a second relief passage 184 which opens to an exhaust pipe 185.

The switches for actuating the solenoid valves 174 and 175 obviously may be mounted at any desired points on or adjacent a mechanism to be controlled, and may be operated either manually or mechanically in well known manners as desired.

In the arrangement shown diagrammatically in Fig. 11, a pair of cylinders and a control valve similar to those shown in Fig. 1 are employed. Parts indicated in Fig. 11 corresponding to parts shown in Fig. 1 are designated by the same reference numerals with the double prime added. Thus, in Fig. 11 a pair of cylinders 20″ and 21″ communicate through passages 97″ and 98″, respectively, with the control valve A″. Air release valves 78″ and 79″ control the operation of the valve A″ in the manner described previously herein for the valves 78 and 79. Additional valves 187 and 188 are mounted at desired points remote from the valve A and are connected by pipe lines 189 and 190, respectively, to the end compartments of the valve A″ (Figs. 1 and 3). Obviously the valve B may be substituted for the valve A in any of its uses.

The control valve 188 may be mounted, for example, for operation by an arm 191 mounted on a rod 192 secured to move with the work performing piston rod 41″. When the piston rod 41″ reaches a predetermined right hand limit of movement, the valve 188 will be actuated to relieve the air pressure in the end compartment 74 in the lower end of the valve A″, and thereby will reverse the flow of air to the cylinders 20″ and 21″ and the direction of movement of the piston rod 41″ and its associated parts.

The second control valve 187, connected to the upper end of the valve A is positioned for actuation by an arm 194 also mounted on the rod 192 as the latter rod reaches a predetermined left hand limit of movement to again reverse the setting of the valve A and thereby the direction of piston rod movement.

While the valve A is designed only for the use of air or gas as an actuating medium, since it exhausts to the atmosphere, in the valve B the use of either a gas or a liquid as an actuating fluid is contemplated.

The invention comprises a simple, easily constructed and easily maintained hydraulic or air-hydraulic feed and control means which is simple and inexpensive to make, and is adaptable to a wide range of uses in many branches of industry as will be apparent to those familiar with the art.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. For controlling a reversible flow fluid control system having a source of pressure fluid, a valve body having a cylindrical valve chamber and a smaller diameter passage both extending therethrough, a small notch formed in each end of the body interconnecting the ends of the chamber and the smaller diameter passage, a spool type valve plunger mounted for axial movement in the chamber, said valve body having a pressure fluid inlet communicating with the chamber and the smaller diameter passage, a valve head secured onto each end of the body to seal the ends of the chamber and of the passage except for a small bleed communication therebetween through said notch, and valve means mounted selectively to release pressure fluid from either end of the valve chamber as required.

2. In a reversible flow fluid control system a valve body having a hole for a valve chamber sleeve and having a second, smaller diameter passage both extending therethrough, a small notch formed in each end of the body interconnecting the ends of the chamber and the smaller diameter passage, a sleeve having a plurality of encircling annular grooves therein in predetermined axially spaced relation fitted closely into the valve chamber sleeve hole, a spool type valve plunger mounted for axial movement in the bore of said sleeve, said sleeve having a hole in the bottom of each groove opening into the bore of the sleeve, an annular groove formed externally around each end of said sleeve, a notch formed in each end of said sleeve interconnecting each end groove around the sleeve and the bore thereof, said valve body having a pressure fluid inlet communicating with one of said sleeve encircling grooves and with the smaller diameter passage, a valve head secured onto each end of the body to seal the ends of the chamber and of the passage except for a small bleed communication therebetween through said notches in the body and in the sleeve ends, and valve means for selectively releasing pressure fluid from each end of the valve chamber.

3. For controlling a reversible flow fluid control system having a source of pressure fluid, a valve body having a cylindrical valve chamber, extending therethrough, said valve body having a smaller diameter passage opening into each end thereof, a small notch formed in each end of the body interconnecting each end of the chamber and an end of a smaller diameter passage, a spool type valve plunger mounted for axial movement in the chamber, said valve body having a pressure fluid inlet communicating with the chamber and the smaller diameter passage opening into each end of the valve body, a valve head secured onto each end of the body to seal each chamber and smaller diameter passage end except for a small bleed communication therebetween through said notch, and valve means mounted selectively to release pressure fluid from either end of the valve chamber as required.

4. For controlling a reversible flow fluid control system having a source of pressure fluid, a valve body having a cylindrical valve chamber extending therethrough, said valve body having a smaller diameter passage opening into each end thereof, a spool type valve plunger mounted for axial movement in the chamber, said valve body having a pressure fluid inlet communicating with the chamber and the smaller diameter passage, a valve head secured onto each end of the body to seal the ends of the chamber and of the passage and a notch of smaller diameter than the smaller diameter passage extending along the otherwise sealed joint between each end of the valve body and the valve head secured thereonto, thereby providing a small bleed communication between each end of the valve chamber and the smaller diameter passage, and valve means mounted selectively to release pressure fluid from either end of the valve chamber as required.

5. In a reversible flow fluid control system a valve body having a hole for a valve chamber sleeve extending therethrough, and having a smaller diameter passage opening into each end of the valve body, said body having bleed means formed therein and interconnecting each end of the chamber and a smaller diameter passage, a sleeve having a plurality of encircling annular grooves therein in predetermined axially spaced relation fitted closely into the valve chamber sleeve hole, a spool type valve plunger mounted for axial movement in the bore of said sleeve, said sleeve having a hole in the bottom of each groove opening into the bore of the sleeve, an annular groove formed externally around each end of said sleeve, said valve body having a pressure fluid inlet communicating with each smaller diameter passage, a valve head secured onto each end of the body to seal the ends of the chamber and of the smaller diameter passage opening thereinto, and valve means for selectively releasing pressure fluid from each end of the valve chamber.

6. In a reversible flow fluid control system a valve body having a hole for a valve chamber sleeve extending therethrough and having a smaller diameter passage opening through each end of the valve body, a sleeve having a plurality of encircling annular grooves therein in predetermined axially spaced relation and including a rabbeted groove at each end thereof, said sleeve being fitted closely into the valve chamber sleeve hole, a spool type valve plunger mounted for axial movement in the bore of said sleeve, said sleeve having a hole in the bottom of each groove opening into the bore of the sleeve, said valve body having a pressure fluid inlet communicating with one of said sleeve encircling grooves other than one of the rabbeted end grooves, a valve head secured onto each end of the body to seal the ends of the chamber and of the sleeve, and of each smaller diameter passage, a pair of small notches along otherwise sealed joints between each valve head and the valve body and sleeve providing a bleed communication between each end of the valve chamber and smaller diameter passage, and valve means for selectively controlling pressure at each end of the valve chamber beyond the plunger, thereby to selectively move the plunger axially within the chamber.

References Cited in the file of this patent

UNITED STATES PATENTS

| | | |
|---|---|---|
| 165,350 | Marchand | July 6, 1875 |
| 688,598 | Coryell | Dec. 10, 1901 |
| 706,688 | Reynders et al. | Aug. 12, 1902 |
| 1,791,613 | Clay | Feb. 10, 1931 |
| 2,132,811 | Tompkins | Oct. 11, 1938 |
| 2,573,368 | Seborg | Oct. 30, 1951 |
| 2,573,563 | Gardiner | Oct. 30, 1951 |
| 2,601,207 | Jacques | June 17, 1952 |
| 2,642,847 | Roys | June 23, 1953 |
| 2,679,235 | Van Meter | May 25, 1954 |
| 2,691,964 | Stickney | Oct. 19, 1954 |
| 2,699,756 | Miller | Jan. 18, 1955 |
| 2,709,421 | Avery | May 31, 1955 |
| 2,729,242 | Olson | Jan. 3, 1956 |